United States Patent
Wen et al.

(10) Patent No.: US 8,745,198 B2
(45) Date of Patent: Jun. 3, 2014

(54) METHOD FOR DISCOVERY AND TROUBLESHOOTING OF NETWORK APPLICATION USAGE AND PERFORMANCE ISSUES

(75) Inventors: Han Wen, San Jose, CA (US); George Zioulas, Sunnyvale, CA (US); Stephen Guarini, San Jose, CA (US); Masood Ahmed, Milpitas, CA (US); Erik Seilnacht, San Francisco, CA (US)

(73) Assignee: Riverbad Technology, Inc., San Francisco, CA (US)

( * ) Notice: Subject to any disclaimer, the term of this patent is extended or adjusted under 35 U.S.C. 154(b) by 1325 days.

(21) Appl. No.: 11/001,985

(22) Filed: Dec. 1, 2004

(65) Prior Publication Data

US 2006/0075094 A1 Apr. 6, 2006

Related U.S. Application Data

(63) Continuation-in-part of application No. 10/937,986, filed on Sep. 10, 2004.

(51) Int. Cl.
  *G06F 15/173* (2006.01)
  *H04L 29/06* (2006.01)

(52) U.S. Cl.
  CPC ............ *H04L 63/1408* (2013.01); *H04L 63/14* (2013.01)
  USPC ........................................................ 709/224

(58) Field of Classification Search
  CPC .................................................. H04L 63/1408
  USPC ................................................... 709/223, 224
  See application file for complete search history.

(56) References Cited

U.S. PATENT DOCUMENTS

| | | | | |
|---|---|---|---|---|
| 6,643,613 | B2 * | 11/2003 | McGee et al. | 702/186 |
| 6,801,940 | B1 * | 10/2004 | Moran et al. | 709/224 |
| 6,901,582 | B1 * | 5/2005 | Harrison | 717/127 |
| 7,143,158 | B2 * | 11/2006 | Hirschman et al. | 709/223 |
| 7,392,309 | B2 * | 6/2008 | Childers et al. | 709/224 |
| 2005/0010660 | A1 * | 1/2005 | Vaught | 709/223 |
| 2007/0100997 | A1 * | 5/2007 | Hirschman et al. | 709/224 |

* cited by examiner

*Primary Examiner* — Hee Soo Kim
(74) *Attorney, Agent, or Firm* — Sterne, Kessler, Goldstein & Fox P.L.L.C.

(57) ABSTRACT

During monitoring of IP network traffic, network application monitoring metrics are extracted, aggregated into logical group types and subsequently analyzed by identifying group sets of the logical group types, correlating anomalous conditions across the logically grouped and aggregated metrics, and isolating the anomalous conditions to one or more related members of the logical group types. The metrics may include usage metrics, network performance metrics and application performance metrics.

21 Claims, 2 Drawing Sheets

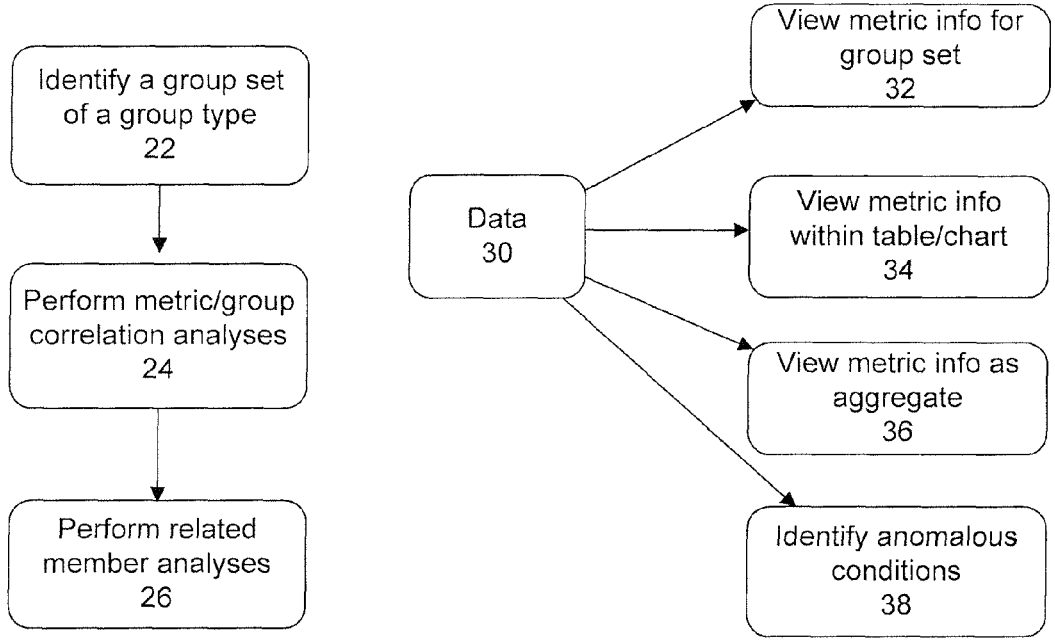
FIG. 2
FIG. 3
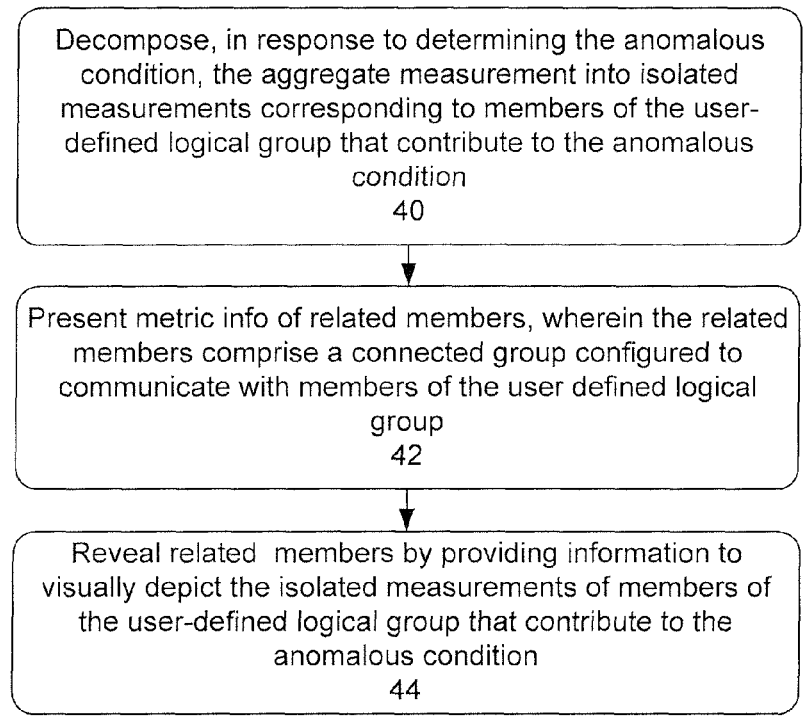
FIG. 4

METHOD FOR DISCOVERY AND TROUBLESHOOTING OF NETWORK APPLICATION USAGE AND PERFORMANCE ISSUES

RELATED APPLICATIONS

This application is a continuation-in-part of, claims the priority benefit of and incorporates by reference U.S. patent application Ser. No. 10/937,986, filed Sep. 10, 2004, and published as U.S. Patent Publication No. 2006/0069768.

FIELD OF THE INVENTION

The invention relates to network application performance monitoring in general and, in particular, to a process for discovering and/or troubleshooting problems with such performance.

BACKGROUND

Today, information technology professionals often encounter a myriad of different problems and challenges during the operation of a computer network or network of networks. For example, these individual must often cope with network device failures and/or software application errors brought about by such things as configuration errors or other causes. Unfortunately for these individuals tracking down the sources of such problems can be tedious and difficult, in part because conventional technologies and methodologies for network troubleshooting tend to focus only on the network devices themselves, rather than on applications making use of the networks. That is, conventional network monitoring and other technologies are focused only on monitoring the actual network devices, such as routers, switches, etc., and not on applications making use of these devices.

Because of such shortcomings, traditional network monitoring methods provide little or no assistance when it comes to evaluating how problems with network devices or applications actually impact a user's experience. That is, the limited visibility offered by current network monitoring techniques, focused on a limited set of network-only metrics, translates into an inability for a troubleshooter to definitively resolve whether a poor user experience is due to problems in the network or in the network application.

Compounding this problem is the fact that individual network devices may assume different roles at various times and under different usage scenarios. For example, nodes such as employees' personal computers, email servers, web application servers, database servers, and file servers may all, at various times, act like clients (typically the node that initiates a connection) or servers (typically the node that responds to a request) in typical IP-based inter-nodal communications depending on the application(s) they are running. For example, a personal computer node can act as a client, by browsing and downloading web pages, while at the same time it can act as a server, by sending e-mail attachments. A web application server can act as a client by requesting information from a database server, while it can also act as a server by responding to application requests from personal computers that connect with it. Furthermore, while nodes are acting as both a server and client, they are often members of one or more logical groups.

Traditional network monitoring solutions group network traffic according to whether a network node is a "client" or a "server" but often fail to appreciate the dynamic nature of these labels. That is, the traditional device-centric monitoring methods do not distinguish between, for example, a personal computer acting as a client for some applications and a server for others and so the results provided by those methods are less useful than they otherwise might be. Moreover, these processes tend to be manually intensive and, hence, rapidly become unmanageable in the face of network reconfigurations and scaling. Therefore, new methods of network application performance monitoring are required.

SUMMARY OF THE INVENTION

The present invention provides for extracting, during monitoring of network traffic made up of Internet protocol (IP) packets, network application monitoring metrics; aggregating the metrics into logical group types; and analyzing logically grouped and aggregated metrics by identifying group sets of the logical group types, correlating anomalous conditions across the logically grouped and aggregated metrics, and isolating the anomalous conditions to one or more related members of the logical group types. The metrics may include one or more of usage metrics, network performance metrics and application performance metrics.

Usage metrics may include: Goodput, Payload, Throughput and Transaction Throughput. Network performance metrics may include: Packet Loss, Retransmission Delay, Retransmission Rate and Round Trip Time. Application performance metrics may include: Application Response Rate, Application Response Time, Client Reset Rate, Connection Duration, Connection Established Rate, Connection Request Rate, Connection Setup Time, Connections Failed Rate, Data Transfer Time, Server Reset Rate and Time to First Byte.

In one embodiment, analyzing logically grouped and aggregated metrics may include displaying a graphical representation of metric information in response to user selection of a quick launch element of a graphical user interface. Isolating the anomalous conditions to one or more related members of the logical group types may be accomplished by decomposing metric information by respective related member, presenting metric information of related members for operator review, and revealing those related members contributing to identified anomalous conditions. Metric information may be decomposed by related members by establishing a hierarchical relationship between respective ones of the logical group types and its related members. This may involve establishing a relationship between a business group and users that are members or constituents of the business group.

BRIEF DESCRIPTION OF THE DRAWINGS

The present invention is illustrated by way of example, and not limitation, in the figures of the accompanying drawings, in which:

FIG. 2 illustrates a process for discovery and troubleshooting of network application usage and performance issues in accordance with an embodiment of the present invention;

FIG. 3 illustrates examples for presenting diagnostic information useful for identifying anomalous conditions according to an embodiment of the present invention; and FIG. 4 illustrates a process for performing related member correlations analyses, according to an embodiment of the present invention.

DETAILED DESCRIPTION

Figure 1:
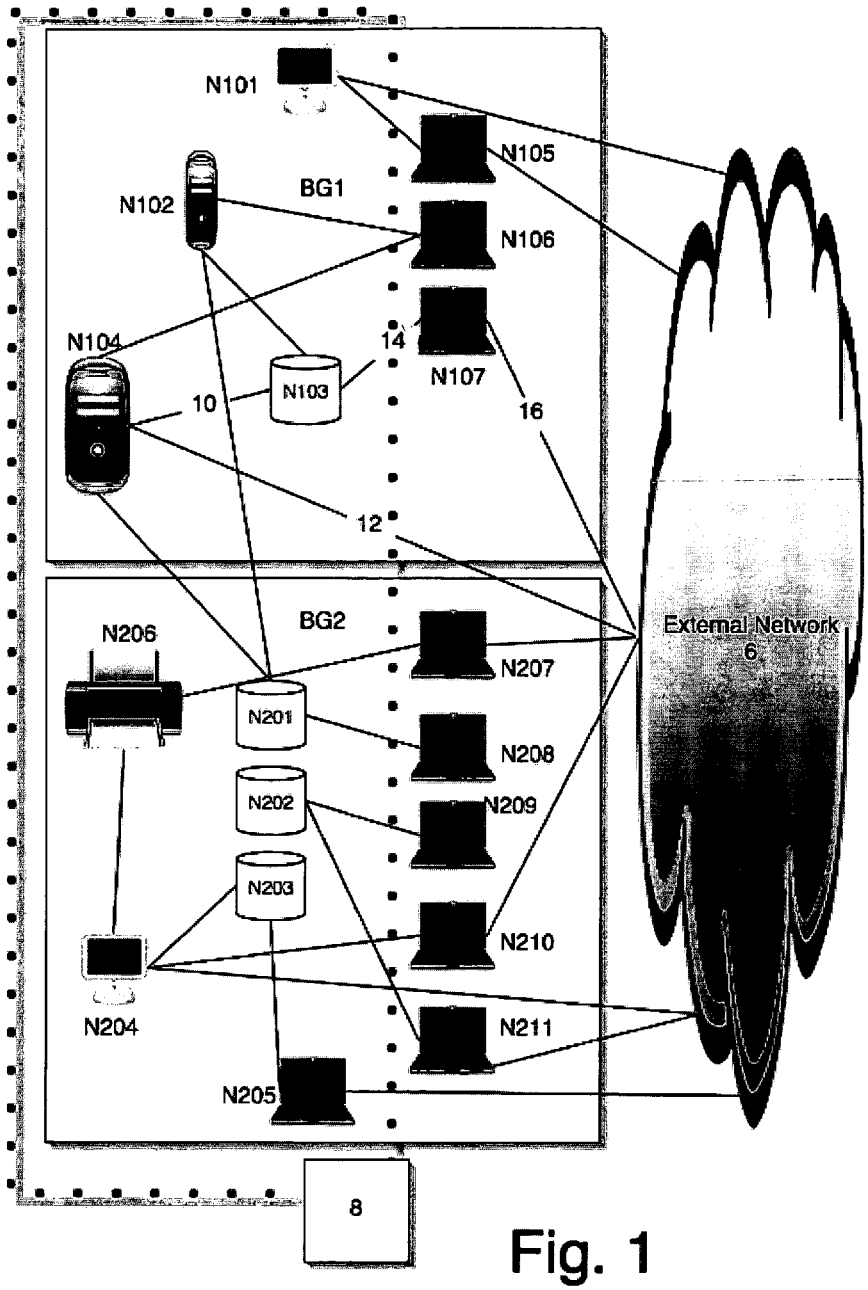
FIG. 1 illustrates a diagrammatic representation of an exemplary group of networked nodes wherein the methods of the present invention may be practiced.

Described herein is a method for discovery and troubleshooting of network application usage and performance issues. In the following description, for purposes of explanation, numerous specific details are set forth in order to provide a thorough understanding of the invention. However, it will be apparent to one with ordinary skill in the art that these specific details need not be used to practice the present invention. In other instances, well-known structures and devices are shown in block diagram form in order to avoid unnecessarily obscuring the present invention.

The present methods allow a user to detect problems and/or discover relevant information with respect to network application usage/performance and then isolate the problem/information to specific contributors (e.g., users, applications or network resources). As will be more fully discussed below, the present process involves, in one embodiment, grouping monitored performance metrics by type, identifying a relevant group set of a group type, correlating metric/group information and then correlating related member information for that group. Such groupings, identifications and correlation analyses are performed with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the present invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

FIG. 1 shows a diagrammatic representation of an exemplary group of networked nodes wherein the methods of the present invention may be practiced. Lines between entities are network links, which may be any mode of establishing a connection between nodes including wired and/or wireless connections.

In this embodiment, a firewall 2 surrounds a geographic collection of networked nodes and separates an internal network 4 from an external network 6. A network traffic monitoring device 8 is shown at the firewall. However, as will be apparent to one skilled in the art, the network traffic monitoring device 8 may be located within the internal network 4, or on the external network 6 or anywhere that allows the method of the present invention to be practiced. Note network traffic monitoring device 8 need not be "inline." That is, traffic need not necessarily pass through network traffic monitoring device 8 in order to pass from the server to the client and vice-versa. The network traffic monitoring device 8 can be a passive monitoring device, e.g., spanning a switch or router, whereby all the traffic is copied to a switch span port which passes traffic to network traffic monitoring device 8.

As shown in FIG. 1, a modern network may include multiple logical groups (e.g., BG1, BG2) of nodes. Logical groups may be business groups, computers performing the same function, computers located within the same building, or any other logical groupings. FIG. 1 shows one simple organization of a small number of computers and other network nodes, but those skilled in the art will appreciate that the number of computers and network nodes may be significantly larger as can the number of connections between them. Modern network configurations are mutable and complex, which is one of the reasons why the present invention is useful. Information representing the total utilization of all nodes in particular directions or activities provides much greater visibility into overall network traffic than does a large collection of individualized node information. The present invention groups network traffic into logical groups that the user can configure, such as frame relay links, or business units BG1, BG2 in order to allow visibility of network traffic relative to the logical group as a whole.

In the exemplary embodiment shown here, BG1 contains several internal network nodes N101, N102, N103, and N104 and external nodes N105, N106 and N107. Similarly, BG2 contains several internal network nodes N201, N202, N203, N204, N205, N206. A network node may be any computer or device on the network that communicates with other computers or devices on the network.

Each node may function as a client, server, or both. For example, node N103, is shown as a database which is connected to Node N104, a web application server, via a network link 10. In this configuration, it is typical for node N104 to function as a client of node N103 by requesting database results. However N104 is also depicted as connected to the external network 6 via network link 12. In this configuration, it is typical for N104 to function as a server, which returns results in response to requests from the external network. Similarly, database node Nl03, which functions as a server to N104, is shown connected to node N107 via a network link 14. N107 may upload information to the database via link 14, whereby N107 is functioning as a server and N103 is functioning as a client. However, N107 is also shown connected to the external network 6 via link 16. This link could indicate that N107 is browsing the Internet and functioning as a client.

Furthermore, network nodes need not be within the internal network in order to belong to a logical group. For example, traveling employees may connect to the logical group network via a virtual private network (VPN) or via ordinary network transport protocols through an external network such as the Internet. As shown in FIG. 1, network nodes N105, N106, N107 belong to logical group BG1, but are outside the firewall 2, and may be geographically distant from the other network nodes in BG1. Similarly, network nodes N207, N208, N209, N210, N211 are members of logical group BG2, but are physically removed from the other members of BG2. It is important to note that the firewall in this configuration is for illustrative purposes only and is not a required element in networks where the present invention may be practiced. The separation between internal and external nodes of a network may also be formed by geographic distance, or by networking paths (that may be disparate or require many hops for the nodes to connect to one another regardless of the geographic proximity).

With the foregoing in mind, consider now the present solution to both the discovery and troubleshooting of network application usage and performance issues. This solution leverages the end-to-end structure of the Internet protocol (IP), which is used in connection with much of the traffic transiting present-day computer networks, to extract from passive monitoring of that network traffic end-to-end information (such as source and destination information) as well as various network and application usage and performance metrics. These metrics are further aggregated into logical groupings that provide side-by-side network and application measurements of tangible elements, such as a particular user or a remote branch office. Given this set of information, processes for detecting problems and/or discovering relevant information and then isolating either the problems or the information to related elements or top contributors, respectively, are provided.

The discovery/troubleshooting processes follow three general steps:

1. Identifying a group set of a group type;
2. Performing metric/group correlation analyses; and
3. Performing related member correlation analyses.

Before describing these steps further, however, certain terminology will be clarified.

The metrics that can be extracted from IP network traffic that are relevant to network application monitoring fall into three main categories: usage, network performance and application performance. Usage metrics include, in alphabetical order: Goodput, Payload, Throughput and Transaction Throughput. Network performance metrics include, in alphabetical order: Packet Loss, Retransmission Delay, Retransmission Rate and Round Trip Time. Application performance metrics include, in alphabetical order: Application Response Rate, Application Response Time, Client Reset Rate, Connection Duration, Connection Established Rate, Connection Request Rate, Connection Setup Time, Connections Failed Rate, Data Transfer Time, Server Reset Rate and Time to First Byte. As indicated above, these metrics can be further subdivided on the basis of the role being played by the content originator and the content requester. The mechanisms by which such information can be employed to enhance monitoring of network traffic are the subject of the above-cited, related patent application.

The metrics collected from the monitored IP traffic are aggregated into logical groups, called group types, which are meaningful for network application monitoring. Among the most relevant group types for purposes of the present invention are users (e.g., as represented in a network by an IP address or hostname) and sets of users referred to as a business group. By meaningful we mean that the monitored metrics are important in the context of measuring the experience of a user or a business group.

In dealing with different discovery or problem scenarios, different sets of users or business groups may be relevant. A group set thus refers to such a set or users or business groups and can be any of the following: any group type (e.g., any user), a specific group type (e.g., a particular business group), a specified list of groups of a given group type (e.g., business groups {A, B, C} that are located in a certain geographical region), or the top groups of a given group type as ranked in terms of a specified metric (e.g., the users with the highest network usage).

For a given business group, there are members that are related to that group that can provide further narrowing of and/or better understanding of discovery or problem scenarios associated with the business group. These are referred to as related members. There are two categories of related members: a connected group and constituents. In the example of a business group, a connected group is a group that is communicating with the subject business group. For example, in the case of a remote office communicating with a home office located in a different geographic region, the home office may be the business group under consideration (from a monitoring/troubleshooting standpoint) while the remote office is considered a connected group. Business group constituents are sub-groups that make up the subject business group and so, continuing the above example, the remote office may be composed of the following constituents:

individual personal computers operated by Bob, Joe and Tom, and an Oracle database server (each, in this case, a user, though there is no reason why another business group could not be a constituent of a subject business group).

For the user group type then, four potential related members of a connected group exist:
- Another user (e.g., a personal computer communicating with, say, an e-mail server).
- A user by application (e.g., personal computer communicating with an e-mail server using a particular application (e.g., Microsoft Outlook™)).
- A business group (e.g., personal computer communicating with, say, the home office).
- A business group by application (e.g., personal computer communicating with the home office through the use of a particular application).

There is in addition, one constituent-type related member:
- An application (e.g., a personal computer using a particular application).

For a business group, there are six possible connected group-type related members:
- A business group (e.g., a remote office communicating with a home office).
- A business group by application (e.g., a remote office communicating with a home office using a particular application).
- A user (e.g., a remote office communicating with a particular resource (e.g., a file server)).
- A user by application (e.g., a remote office communicating with a particular resource through a particular application).
- A user by business group (e.g., a remote office communicating with a particular resource in the home office).
- A user by business group by Application (e.g., a remote office communicating with a particular resource in the home office through the use of a particular application).

There are in addition, three constituent-type related members:
- An application (e.g., a remote office using a particular application).
- A user (e.g., a particular personal computer in the remote office).
- A user by application (e.g., a particular personal computer in the remote office using a particular application).

Using this terminology, the present process 20 for discovery and troubleshooting may be explained with reference to FIG. 2. In step 22 (identify a group set of a group type), an operator is permitted to select a group set for a group type and, based on that selection, access the corresponding information. As used herein, the term "operator" is intended to refer to the individual or individuals that use and interpret the data provided by the present network application monitoring solution. In troubleshooting mode, the operator usually knows a priori which groups of a given group type are suspect. For example, a customer call regarding a performance issue with an application may have alerted the operator and the caller may have been identified as a user or a related member of a particular business group. In discovery mode, the operator is usually interested in the usage and, perhaps secondarily, in the performance of a particular group of a given group type. The overall objective of step 22 is for the operator to narrow the field of information to search for by choosing a relatively small set of groups for further analysis based on the operator's knowledge of a particular scenario or interest.

The data on which the remaining analyses are based is extracted from passive monitoring of IP-based network communications. Such extractions may be performed by one or more monitoring devices configured in accordance with the present invention and located at convenient points within an enterprise or other network so that substantially all of the network traffic of interest may be examined. In general the network to be monitored will include several nodes and may also include groups of nodes communicatively coupled to one another through a sub network or a wide area network such as the Internet. The term "Internet" as used herein refers to a network or networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. However, it should be recognized that the discussion of the Internet herein is not meant to indicate that the present invention cannot be used with other computer networks, such as local area networks, metropolitan area networks and the like. Indeed, such networks may significantly benefit from the use of the present invention, which is fully compatible therewith. Thus, the discussion of the Internet herein is for convenience only and should not be read as limiting the more general scope and applicability of the methods and systems of the present invention.

In some cases, the network monitoring device may be a collection of computer-readable instructions that is included as one or more subroutines in a router, switch, or other node. The monitoring device monitors traffic on the network of interest and may provide data gathered therefrom to a local and/or remote storage device. The data stored by the monitoring device may be subsequently accessed for aggregation, compilation, correlation and/or display through an appropriate user interface. The user interface may be a computer software routine or subroutine that executes on a computer system (e.g., a personal computer system) communicatively coupled to the monitoring device and/or its associated storage platform. Preferably, the present user interface is a graphical user interface configured so as to allow the operator to review both summary and detailed information regarding the network parameters being monitored in tabular, graphical or other fashions appropriate to such work.

For example, one feature of the graphical user interface is the ability for the operator to select the group set of interest. This may be done in any convenient fashion, for example through an appropriate menu command, selection of graphical representations of nodes or groups of nodes displayed to the operator (e.g., in a graphical representation of the network of interest), or via command line instruction. Once the operator has indicated the target set of groups, then step 24 (perform metric/group correlation analyses) is executed.

In troubleshooting mode, this process correlates anomalous conditions across one or more metrics and groups to identify symptoms of problems being experienced in the network. In discovery mode, the usage and/or performance of the specified groups are correlated. In either case, four distinct functional mechanisms are provided in order to assist the operator.

As shown in FIG. 3, the present user interface allows the operator to view the group set data in various ways. For example, the user may view the data (i.e., the metric information) 30 for the selected set of groups within one or more tables and/or charts (process 32). It some cases it may be important (e.g., for usability reasons) to be able to quickly launch a given table or chart with a pre-selected set of groups through a cursor control operation (e.g., a toolbar button selection, a double-click, or right-click). The operator can make the pre-selection by selecting the set of groups in an existing table or chart displayed via the present user interface. The ability to quickly launch such tables or charts with pre-selected groups (e.g., instead of having to drag and drop such groups into various tables/charts) provides the flexibility the operator needs to rapidly perform the correlation analyses.

The second mechanism provided by the present user interface is the ability for the operator to view any metric, and potentially more than one metric, within a table or chart (process 34). This is often important in any type of correlation analysis. This second mechanism differs from the first mechanism in that while the first mechanism provides the ability to quickly add different groups to an analysis, this second mechanism provides the ability to quickly add or delete different metrics therefrom. By way of example, consider a scenario where an operator knows a problem exists in two different remote offices. The operator may decide to first evaluate the throughput in each office using the quick launch capability described above. Based on these observations, the operator may next decide to evaluate other metrics (such as application response time and round trip time) to see how application/network performance is affected. This second mechanism provides the ability to quickly change metrics so that the operator need not break the troubleshooting workflow. If the new metric evaluation reveals that the problem is isolated to one of the offices the operator can then continue to evaluate various metrics for related groups of that office (e.g., by switching groups using the first quick launch mechanism and then studying different metrics related to the new groups using the second mechanism).

The third mechanism is the ability for the operator to view any metric in ways that are appropriate for the information required (process 36). Tables, by their nature, present "summary" information for the metrics and groups specified. This summary information can consist of: average, minimum, maximum, $N^{th}$ percentile or standard deviation, etc. Charts, on the other hand, can present the information for metrics and groups specified in the other meaningful ways, for example as a time series, scatter plot, distribution, cumulative or pie chart, etc. The present user interface allows for any and all such presentations for any and all metrics of interest.

The fourth mechanism is the ability to identify anomalous conditions (process 28). This generally requires analyses of time periods where the metrics and groups satisfy certain (anomalous) conditions. In addition to being able view any or multiple metrics, the operator is provided with facilities to add and remove additional group sets that can be of different group types to correlate anomalies across different groups as wells as different metrics. The results of such analyses may be provided through different visual indicators. In tables, cells where metrics and groups have anomalous conditions identified can be appropriately highlighted by colors that signify the severity of the anomaly. In time series charts, overlay of anomalous condition thresholds can help operators quickly identify anomalous regions. If the analyses are performed programmatically, visual indication can be provided of anomalous time periods in the time series charts by highlighting the regions also by colors that signify the severity of the anomaly.

Returning to FIG. 2, with the symptoms identified in troubleshooting mode or the usage and/or performance quantification in discovery mode, step 26 (perform related member correlation analyses) completes the solution process. For the troubleshooting mode, this step isolates the anomalous conditions to one or more related members (e.g., a particular personal computer may be uncovered executing a peer-to-peer application to swap music files, which saturates the network link, resulting in slow e-mail performance for all other users). For discovery mode, this step identifies the top related members contributing to the usage and/or performance issues for the group (e.g., the alarming trend in network usage growth for a remote office may be determined to be due to one or two personal computers using unapproved network applications).

As illustrated in FIG. 4, performing the related member correlation analyses includes three distinct functional operations. The first is decomposing the metric information by related members (step 40). According to embodiments the decomposing can be in response to determining the anomalous conditions (step 38) and can comprise decomposing the aggregate measurement into isolated measurements corresponding to the members of a user-defined logical group that contributes to the anomalous condition. In this operation, a hierarchical relationship is established between a group type and its related members so that an operator can determine what members are related to the group type. For example, a relationship may be established programmatically between a business group and various users that are members or constituents of that business group.

Next, the metric information of related members is presented for the operator in various tables and/or charts (step 42). According to embodiments, the related members comprise a connected group configured to communicate with members of the user defined logical group. This requires the decomposition of any metric of a group of a given group type into its related members, using the hierarchical relationship that has been established. That decomposition will identify related members that are the primary contributors to the specified metric.

Finally, any related members contributing to the previously identified anomalous conditions are revealed (step 44). According to embodiments, the related members can be revealed by providing information to visual depict the isolated measurements of members of the user-defined logical group that contribute to the anomalous condition. This requires decomposition analyses restricted to the anomalous time periods. This allows for isolation of network application usage and performance problems to one or more users, applications or the network.

In the above description where actions of an operator are specified it is generally the case that the operator is prompted for an input (e.g., a keystroke, a cursor control event, etc.) to indicate a selection of an available option. As such inputs are received from the operator, corresponding outputs are provided in response thereto. These outputs may include displays (e.g., in a graphical, textual or combined graphical and textual form) of network resources and/or metric information associated therewith. As mentioned above, in some cases the metric information will be provided in a summary form. This may involve the value of the measured parameter to be displayed be some form of compilation or aggregation, or in some cases may include the display of raw data points captured at a particular point in time, defined by network operation software to be a mean operating time or a defined network evaluation time. In other cases, detailed metric information may be presented.

Through this computer-facilitated dialog, the operator is provided with a vehicle for isolating network application problems. That is, having been provided with the ability to go from summary value information to more detailed information, the operator is provided with the facilities necessary to perform an analysis of the network conditions. Thus, a method for discovery and troubleshooting of network application usage and performance issues has been described.

Although in the foregoing specification, the present invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of troubleshooting performance of a network, comprising:
   monitoring network traffic made up of Internet protocol (IP) packets to generate measurements of network application monitoring metrics;
   aggregating the measurements into respective aggregate measurements that correspond to one or more user-defined logical groups;
   determining an anomalous condition from an aggregate measurement corresponding to one of the user-defined logical groups;
   decomposing, in response to determining the anomalous condition, the aggregate measurement into isolated measurements corresponding to members of the user-defined logical group that contribute to the anomalous condition; and
   providing information to visually depict the isolated measurements members of the user-defined logical group that contribute to the anomalous condition,
   wherein the one or more user-defined logical groups each comprise a connected group configured to communicate with members of the one or more user-defined logical group.

2. The method of claim 1, wherein monitoring network traffic comprises monitoring measurements related to one or more of usage metrics, network performance metrics and application performance metrics.

3. The method of claim 2, wherein the usage metrics comprise one or more of: Goodput, Payload, Throughput and Transaction Throughput.

4. The method of claim 2, wherein the network performance metrics comprise one or more of: Packet Loss, Retransmission Delay, Retransmission Rate and Round Trip Time.

5. The method of claim 2, wherein the application performance metrics comprise one or more of: Application Response Rate, Application Response Time, Client Reset Rate, Connection Duration, Connection Established Rate, Connection Request Rate, Connection Setup Time, Connections Failed Rate, Data Transfer Time, Server Reset Rate and Time to First Byte.

6. The method of claim 1, wherein aggregating comprises aggregating measurements for a logical group that comprises a set of users of the network.

7. The method of claim 1, wherein the logical groups comprise a plurality of group types, and
   wherein aggregating comprises aggregating measurements for a group type.

8. The method of claim 1, wherein at least some of the logical groups are associated with a geographic location of the network, and
   wherein aggregating comprises aggregating measurements based on a geographic location.

9. The method of claim 1, wherein members of the logical groups are ranked according to one or more of the metrics, and
   wherein aggregating comprises aggregating measurements for a group based on a ranking of members of the group.

10. The method of claim 1, wherein determining the anomalous condition comprises comparing the aggregate measurements across a plurality of logical groups.

11. The method of claim 1, wherein determining the anomalous condition comprises comparing the aggregate measurements across a plurality of types of logical groups.

12. The method of claim 1, wherein determining the anomalous condition comprises comparing the aggregate measurements across a plurality of different metrics.

13. The method of claim 1,
   wherein decomposing the aggregate measurement comprises identifying isolated measurements from the aggregate measurement for each member of the connected group.

14. The method of claim 1, wherein at least one logical group comprises a set of constituent sub-groups, and wherein decomposing the aggregate measurement comprises identifying measurements from the aggregate measurement for each sub-group.

15. The method of claim 1, wherein decomposing the aggregate measurement comprises:
   selecting at least one of the one or more user-defined logical groups responsive to a user input;
   providing information to visually depict the aggregate measurement for the selected at least one logical group; and
   providing information to visually depict isolated measurements that correspond to a member of the selected at least one group in response to the user input.

16. A system configured to facilitate troubleshooting performance of a network, wherein the network comprises one or more user-defined logical groups, wherein each logical group comprises a set of members related to the network, and wherein network application performance is measured based on measurements of one or more metrics, said system comprising:
   an input configured to receive measurements from monitoring of network traffic made up of Internet protocol (IP) packets, wherein the measurements are network application monitoring metrics;
   a processor, configured by executable program code, to:
      aggregate the measurements into respective aggregate measurements that correspond to one or more user-defined logical groups,
      determine an anomalous condition from a aggregate measurement corresponding to one of the user-defined logical groups
      decompose, in response to determining the anomalous condition, the aggregate measurement into isolated measurements corresponding to members of the user-defined logical group that contribute to the anomalous condition, and
      providing information to visually depict the isolated measurements and the members of the user-defined logical group that contribute to the anomalous condition,
   wherein the one or more user-defined logical groups each comprise a connected group configured to communicate with members of the one or more user-defined logical group.

17. The system of claim 16, wherein the processor is configured to provide information to visually depict the aggregate measurement in a plurality of formats.

18. The system of claim 16, wherein at least one user-defined logical group comprises a set of related members that is communicating with members of the at least one logical group, and wherein the processor is configured to decompose the aggregate measurement based on identifying measurements from the aggregate measurement for each of the related members.

19. The system of claim 16, wherein at least one user-defined logical group comprises a set of constituent subgroups, and wherein the processor is configured to decompose the aggregate measurement based on identifying measurements from the aggregate measurement for each subgroup.

20. The system of claim 16, wherein the processor is configured to decompose the aggregate measurement based on selecting at least one of the one or more user-defined logical groups responsive to a user input, providing information to visually depict the aggregate measurement for the selected at least one logical group, and providing information to visually depict isolated measurements that correspond to members of the selected at least one group in response to the user input.

21. The method of claim 1, wherein the decomposing includes establishing a hierarchical relationship between a group type of the user-defined logical group and its related members.

* * * * *